(12) United States Patent
Stukenborg et al.

(10) Patent No.: US 8,615,436 B2
(45) Date of Patent: Dec. 24, 2013

(54) ADVERTISING INVENTORY ALLOCATION

(75) Inventors: Steve Stukenborg, Mountain View, CA (US); Daniel J. Zigmond, Menlo Park, CA (US); Jason Bayer, Mountain View, CA (US); Danny Tom, Hayward, CA (US); Kaustuv Kaustuv, Palo Alto, CA (US); Jagpreet S. Duggal, Seattle, WA (US); Robert D. Gardner, Irvine, CA (US); Deepak Chandra, Irvine, CA (US); Neil C. Rhodes, Redlands, CA (US); Noam Nisan, Sho'eva (IL); Tal Franji, Hod HaSharon (IL); Misha Seltzer, Kfar Saba (IL); Hal R. Varian, Danville, CA (US); Yossi Matias, Tel Aviv (IL)

(73) Assignee: Google Inc., Mountain View, CA (US)

( * ) Notice: Subject to any disclaimer, the term of this patent is extended or adjusted under 35 U.S.C. 154(b) by 530 days.

(21) Appl. No.: 12/504,152

(22) Filed: Jul. 16, 2009

(65) Prior Publication Data
US 2010/0017298 A1 Jan. 21, 2010

Related U.S. Application Data

(60) Provisional application No. 61/081,600, filed on Jul. 17, 2008.

(51) Int. Cl.
*G06Q 30/00* (2012.01)
*H04N 7/10* (2006.01)

(52) U.S. Cl.
USPC .............. 705/14.71; 725/32; 725/34; 725/35

(58) Field of Classification Search
USPC ........... 705/14.71, 26, 14; 725/35, 34, 14, 46, 725/112, 32; 707/104; 709/224
See application file for complete search history.

(56) References Cited

U.S. PATENT DOCUMENTS

| | | | |
|---|---|---|---|
| 2005/0137958 A1 | 6/2005 | Huber et al. | |
| 2006/0106709 A1 | 5/2006 | Chickering | |
| 2008/0004962 A1* | 1/2008 | Muthukrishnan et al. | 705/14 |
| 2008/0004990 A1 | 1/2008 | Flake et al. | |
| 2009/0030788 A1* | 1/2009 | Boudah et al. | 705/14 |

OTHER PUBLICATIONS

International Search Report and the Written Opinion of the International Searching Authority, or the Declaration, PCT/US2009/051056, dated Feb. 18, 2010, 11 pages.
Notification Concerning Transmittal of International Preliminary Report on Patentability, PCT/US2009/051056, dated Jan. 27, 2011, 6 pages.

(Continued)

*Primary Examiner* — Sun Li
(74) *Attorney, Agent, or Firm* — Fish & Richardson P.C.

(57) ABSTRACT

A simultaneous ascending price auction ("SAA") can be used to allocate advertising inventory to bidders. The advertising inventory can be, for example, radio or television advertisement spots ("spots"). The bidders can be advertisers that can provide advertisements for presentation in the spots. Two or more contiguous spots can define an advertising block. Spots or advertising blocks can be allocated to advertisers by the SAA mechanism based on bid criteria. The SAA can perform simultaneous advertisement scheduling and pricing. The auction allocation can be optimized to facilitate efficient allocation of advertisements to spots or blocks.

21 Claims, 6 Drawing Sheets

(56) References Cited

OTHER PUBLICATIONS

Bollapragada S. et al., "NBC's Optimization Systems Increase Revenues and Productivity" [online]. Interfaces, 32(1): Jan.-Feb. 2002 [retrieved on Oct. 1, 2012] Retrieved from Internet electronic mail http://interfaces.journal.informs.org/content/32/1/47.full.pdf, 14 pages.

Kimms and Müller-Bungart "Revenue management for broadcasting commercials: the channel's problem of selecting and scheduling the advertisements to be aired", Int. J. Revenue Management, vol. 1, No. 1, 2007, 19 pages.

\* cited by examiner

ADVERTISING INVENTORY ALLOCATION

CROSS-REFERENCE TO RELATED APPLICATIONS

This application claims priority under 35 U.S.C. §119(e) to U.S. Provisional Application Ser. No. 61/081,600 titled "Advertising Inventory Allocation" filed Jul. 17, 2008, the disclosure of which is incorporated herein by reference in its entirety.

BACKGROUND

This document relates to content distribution.

Advertisers conventionally purchase advertising inventory (e.g., advertisement spots) from advertising publishers (e.g., television stations, radio stations, and other providers of information over different types of media) that facilitates pre-defined advertisement targeting. For example, advertisers may have a well defined target market that they are attempting to reach with their advertising message. Similarly, advertisers can perform very detailed analysis on the return that they can expect from a properly targeted advertisement. Advertisers can select advertising inventory in an effort to satisfy their targeting and revenue projection efforts.

Advertising publishers/owners of advertising inventory can place restrictions on their advertising inventory in an attempt to efficiently allocate the advertising to advertisers. For example, owners of advertising inventory can restrict the types of advertisements that can appear near other advertisements. Similarly, owners of advertising inventory can restrict the number of advertisements that are placed by a single advertiser.

Advertising inventory can be allocated to a limited number of advertisers during any given time period. Allocation can be performed, for example, in an attempt to balance the constraints imposed by advertisers and the restrictions placed on the advertising inventory by the owners of the inventory. However, inefficient allocation of the advertising inventory can affect the value of the advertising inventory to advertisers and, in turn, revenue received by the owners of the advertising inventory.

SUMMARY

A simultaneous ascending price auction ("SAA") can be used to allocate advertising inventory to bidders. The advertising inventory can be, for example, radio or television advertisement spots ("spots"). The bidders can be advertisers that can provide advertisements for presentation in the spots. Two or more contiguous spots can define an advertising block. Spots or advertising blocks can be allocated to advertisers by the SAA mechanism based on bid criteria. The SAA can perform simultaneous advertisement scheduling and pricing. The auction allocation can be optimized to facilitate efficient allocation of advertisements to spots or blocks.

An allocation can be performed according to a first implementation of an SAA. The SAA can receive spot preferences, bids, and constraints for each advertiser. In turn, the SAA can identify auction winners and the prices to be paid by the auction winners based on, for example, the preferences, bids, and constraints. In some implementations, the allocation and pricing can be performed using a per-spot price.

Optimization can be performed by re-allocating the bidders based on a per-bid price and by allocating filler bidders to unallocated spots. Additional optimization can be performed, by de-allocating blocks that include an unallocated spot, allocating the de-allocated blocks to the filler bidders, and then re-allocating the spots to the bidders based on a re-allocation constraint.

In general, one aspect of the subject matter described in this specification can be embodied in a method of allocating advertising inventory. The method of allocating advertising inventory can include the actions of identifying advertisement spots for allocation, wherein two or more contiguous advertisement spots define an advertisement block; receiving bid criteria from bidders; allocating advertisement spots to first bidders based on a per-spot price; de-allocating the allocated advertisement spots in an advertisement block that includes an advertisement spot that was not allocated based on the per-spot price; and re-allocating the advertisement spots in the advertisement block to the first bidders based on a per-bid price. Other embodiments of this aspect include corresponding systems, apparatus, and computer program products.

In some implementations, the method of allocating advertising inventory can further include the actions of allocating advertisement spots in the advertisement block, that were not re-allocated based on a per-bid price to filler bidders; de-allocating the advertisement block when the advertisement block includes an unallocated advertisement spot after allocation of the advertisement spots to the filler bidders; allocating the advertisement spots of the de-allocated advertisement block to the filler bidders; re-allocating the advertisement spots of the advertisement block to the first bidders based on a re-allocation constraint that requires spots that are allocated to a first common bidder be re-allocated together to a second common bidder; and releasing the advertisement block when the advertisement block is not completely allocated after the re-allocation of the advertisement spots of the de-allocated advertisement block. Other embodiments of this aspect include corresponding systems, apparatus, and computer program products.

Particular embodiments of the subject matter described in this specification can be implemented so as to realize, none, one or more of the following advantages. More efficient allocation of advertising inventory can be realized by optimizing the allocation to advertisers so that a block of spots are allocated at prices that realize a market value of the spots. These advantages can be separately realized or realized in combination in various implementations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
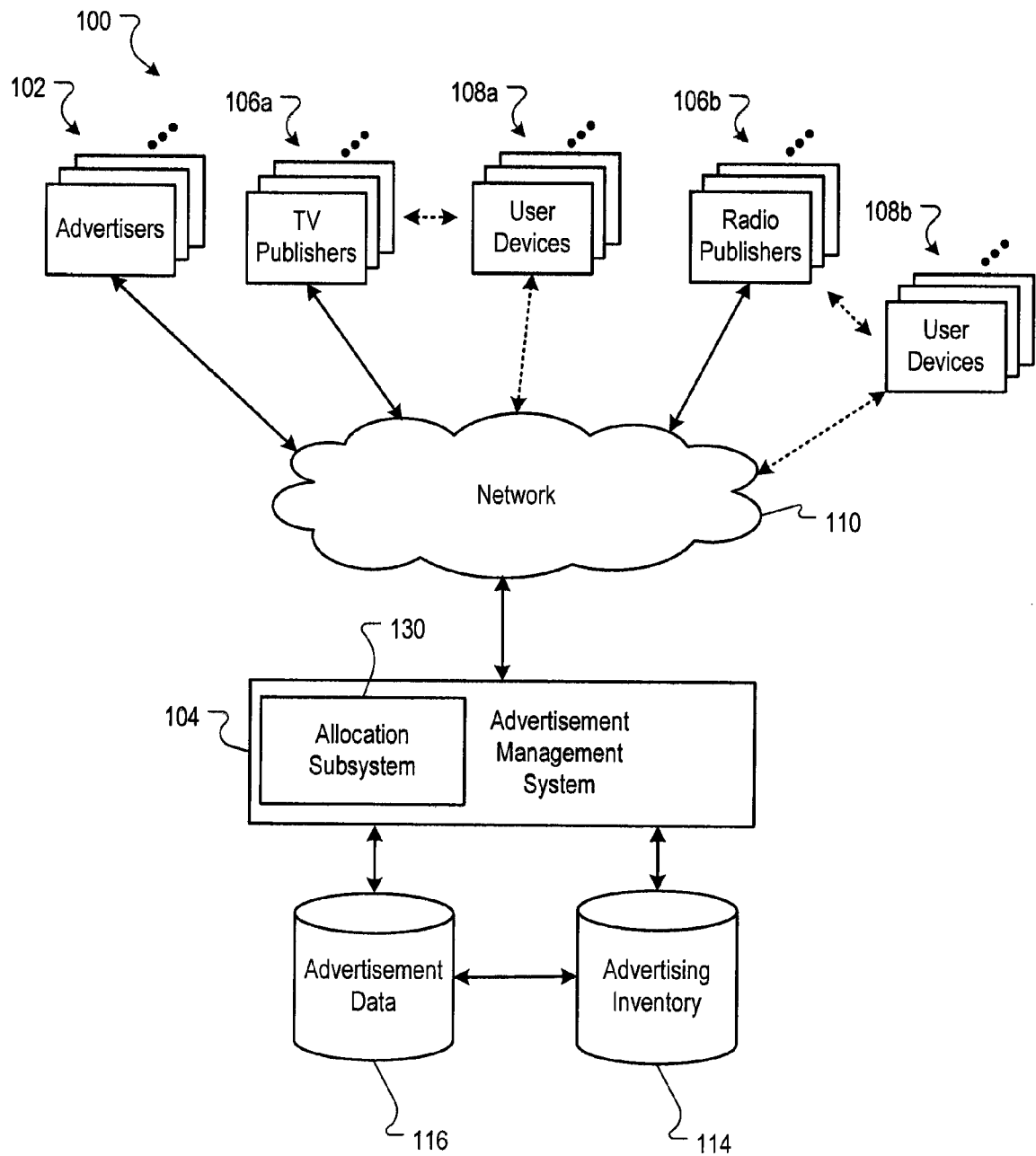
FIG. 1 is a block diagram of an example online environment through which advertising inventory can be allocated.

FIG. 1 is a block diagram of an example online environment 100 through which advertising inventory can be allocated. An online environment 100 can facilitate the identification and allocation of advertising inventory (e.g., advertisement spots) that are provided by, for example, TV publishers 106a and radio publishers 106b to advertisers 102. In some implementations, the allocation can be performed according to a simultaneous ascending price auction (SAA). In these implementations, the SAA can be optimized to allocate media (e.g., television or radio) placements through an allocation optimization that can be based on bid criteria provided by the advertisers 102 and placement requirements provided by the publishers 106a and 106b.

The allocation can be implemented over a computer network 110, such as a local area network (LAN), wide area network (WAN), the Internet, or a combination thereof, that connects advertisers 102, an advertisement management system 104 and publishers 106a and 106b. In some implementations, the TV publishers 106a can be television providers (e.g., television stations, cable providers, terrestrial television providers, or satellite providers) that can provide content to user devices 108a that are television receiving devices (e.g., televisions that can receive terrestrial or cable signals or internet television receivers). In other implementations, the radio publishers 106b can be radio broadcasters (e.g., radio stations, radio networks, or satellite radio providers) that can provide radio programming to user devices 108b that are radio receivers (e.g., terrestrial radios, satellite radios, or internet radios). Other types of publishers are possible including those that deliver content through other mediums.

Throughout this document, allocations of television and/or radio spots are discussed. However, the methods, systems, and devices disclosed can be implemented to allocate advertising inventory in any content distribution network.

§1.0 Advertisement Publishing

In some implementations, one or more advertisers 102 can directly, or indirectly, enter, maintain, and track advertisement information in the advertising management system 104. The advertisements can be, for example, television advertisements that are provided to TV publishers 106a. The television advertisements can be commercials that air at scheduled times (e.g., commercial breaks) during or in between scheduled content. Television advertisements can also include scrolling text or video overlays that appear during program content. For example, a message identifying sponsorship can scroll across the bottom of a television screen during a television program.

The advertisements can also be radio advertisements that are provided to radio publishers 106b. For example, the radio advertisements can be audio that is presented at scheduled breaks in programming (e.g., between songs or program segments). Additionally, radio advertisements can include textual advertisements that are presented on radio receiver displays. For example, the textual advertisement can scroll across a digital radio display at any time and can correspond to audio content that is being presented concurrently or be independent of the audio content.

Television and radio commercial breaks can include one or more advertisement spots ("spot"). Each spot can be a predetermined time slot in which content, e.g., advertisements, can be presented. Two or more contiguous spots can define an advertisement block ("block"). These spots can be scheduled well in advance of the time in which they occur. For example, television networks may schedule programs and commercial breaks days, weeks, or months in advance of the time that they occur. Accordingly, the allocation of the spots can potentially occur over the course of several hours, days, weeks, or longer.

The advertisements can also be Internet-based advertisements for presentation on a user's computing device. For example, Internet-based advertisements can be in the form of audio advertisements, video advertisements, graphical advertisements, such as banner advertisements, text only advertisements, image advertisements, advertisements combining one of more of any of such components, etc., or any other type of electronic advertisement document. The Internet-based advertisements may also include embedded information, such as a links, meta-information, and/or machine executable instructions, such as HTML or JavaScript™, depending on the application.

In some implementations, data identifying spots that are available for allocation can be provided to the advertisement management system 104 over the network 110. For example, each TV publisher 106a and radio publisher 106b can upload data that identifies, for example, the day, time, and duration of its available spots. Additionally, each publisher 106a and 106b can include requirements for spot allocation. One restriction that can be imposed by a TV publisher 106a or radio publisher 106b is a full block restriction. For example, the TV publisher 106a or radio publisher 106b can refuse an allocation of spots in a block if any of the spots in the block remain unallocated. According to these implementations, therefore, the advertisement management system 104 can allocate all of the spots in a block in order to allocate any of the spots in the block.

TV publishers 106a and radio publishers 106b can also include a restriction that defines a reserve price for a spot and/or a block. The reserve price can be a minimum price that the TV publisher 106a or radio publisher 106b will accept for the spot or block. Accordingly, the spot or block can only be allocated by the advertising management system 104 if the price at which the spot or block is allocated exceeds the reserve price. While particular examples of spot restrictions have been provided, TV publishers 106a and radio publishers 106b can impose additional restrictions on the allocation of spots.

§2.0 Advertising Inventory Allocation

Advertising inventory can include all advertisement spots that are available for allocation to advertisers 102 through the advertisement management system 104. In some implementations, an allocation subsystem 130 of the advertisement management system 104 can perform allocation of advertising inventory. In some implementations the allocation subsystem can identify available advertising inventory and constraints, allocate the advertising inventory according to a simultaneous ascending price auction based on per-spot prices and the constraints, optimize the allocation based on per-bid prices and the constraints, allocate spots to filler bidders, and perform a re-allocation optimization based on constraints imposed by advertisers 102 and/or publishers 106. Each phase of the allocation is described below.

The allocation subsystem 130 can be implemented, for example, as a data processing system (e.g., computer, server, or any other data processing system).

§2.1 Spot Constraints

In some implementations, the allocation subsystem 130 can receive data from publishers 106 identifying the advertisement spots that are available for allocation. As discussed, spots can be associated with predetermined time slots in the publisher's programming in which advertisements can be presented. For example, a television broadcaster may provide a 30-second spot for allocation at a specified time on a specified day. The allocation subsystem 130 can receive data from the television broadcaster that identifies this spot. In turn, the allocation subsystem 130 can store this spot information in the advertising inventory store 114.

When a particular publisher 106 provides two or more contiguous advertisement spots for allocation, the spots can define a block. The allocation subsystem 130 can store each of the spots in the block as a spot for allocation. In some implementations, the allocation subsystem 130 can identify spots that define a common block and associate each of the spots with a common block identifier. Spots that are associated with a common block identifier can be allocated individually to separate advertisers 102 or the spots can be allocated together, as a block, to a single advertiser 102. If the spots are allocated individually, and the publisher 106 that owns the block includes a complete block restriction, the allocation subsystem 130 can determine whether all of the spots having a common block identifier are allocated before finalizing the allocation for any of the spot allocations.

In some implementations, the allocation subsystem 130 can divide the spots into smaller advertisement units for allocation. For example, if a publisher 106 provides a 30-second spot for allocation, the allocation subsystem 130 can divide the 30-second spot into two 15-second spots. Similarly, if a publisher 106 provides a 60-second block of spots, the allocation subsystem 130 can divide the 60-second block of spots into two 30-second spots, or four 15-second spots. A publisher 106 can prevent division of its spots by including, for example, a spot time restriction that only allows allocation of the spot if the entire spot is allocated to a single advertiser 102. Even if the publisher 106 does not include a spot time restriction, the publisher 106 can still require the entire spot be allocated before any allocations of the spot portions are finalized.

Publishers 106 can also restrict allocation of a spot by providing a reserve price for a spot. In some implementations, the allocation subsystem 130 can prevent allocation of the spot to any advertiser 102 unless the advertiser 102 will pay at least the reserve price for the spot. For example, a publisher 106 can require that an advertiser 102 pay a minimum of $1,000 for a 30-second spot. If no advertiser 102 offers to pay at least $1,000 for the 30-second spot, then the spot will remain unallocated.

In some implementations, publishers 106 can further restrict allocation of spots based on the content of the advertisements that are allocated to the spots. For example, a publisher 106 can specify a threshold number of advertisers 102 from a particular industry that can advertise within a specified time period. Similarly, publishers 106 can specify a number of spots that can be allocated to a single advertiser. In some implementations, the allocation subsystem 130 can enforce these restrictions by maintaining a list of advertisers that have been allocated spots and confirming that any subsequent allocation does not violate the restrictions that have been imposed on the spot to be allocated.

§2.2 Spot Allocation

In some implementations, advertising inventory can be allocated to advertisers 102 based on a simultaneous ascending price auction. In some implementations, all of the advertising inventory that is available over a specified time period can be auctioned at the same time. For example, all television or radio spots that are available over one day can be auctioned simultaneously. The auction can be performed, for example, by the allocation subsystem 130. The allocation subsystem 130 can conduct the auction so that advertisement scheduling and spot pricing result from the auction.

The allocation subsystem 130 can receive bid criteria from bidders upon which the auction can be based. The bidders can be, for example, advertisers 102 that can provide advertisements for presentation in the spots. The bid criteria can include a bid price, a budget, spot criteria, and other bid criteria. The bid criteria can be provided individually for each spot that is being auctioned or the bid criteria can be applied globally to all spots. The allocation subsystem 130 can store the bid criteria in the advertisement data store 116.

The bid price can be a maximum price that the advertiser 102 will pay for an individual spot or block of spots. The budget can be a maximum price that the advertiser 102 will pay for all of the spots that are allocated to the advertiser 102. In some implementations, the allocation subsystem 130 may allocate spots to the advertiser 102 until the allocation of another spot causes the budget to be exceeded. Table 1 provides example bidders and bid criteria that can be submitted for spots 206, 208, 210, 212, and 214 in FIG. 2A.

TABLE 1

| Advertiser | Bid | Duration | Spots |
|---|---|---|---|
| A | $1500 | 60 seconds | 206 & 208 |
| B | $1000 | 30 seconds | 206 |
| C | $ 750 | 30 seconds | 210 |
| D | $ 500 | 60 seconds | 212 & 214 |
| E | $ 550 | 30 seconds | 212 or 214 |

In some implementations, the allocation subsystem 130 can auction spots based on the bid criteria provided in Table 1 and one or more restrictions imposed on the spots by the publishers 106. An allocation optimization process can be used to optimize the allocation according to the bid criteria and restrictions. While constraints and restrictions are provided for example purposes, other constraints and restrictions can be used by the allocation subsystem 130.

§2.2.1 Spot Allocation Using Per-Spot Prices

Once bids and constraints are received, the allocation of the inventory can begin. In some implementations, the allocation begins with a spot allocation using per-spot bid prices. The per-spot price can correspond to the price that an advertiser 102 will pay for allocation of an individual spot. The per-spot price can be specified by the advertiser 102 or the per-spot price can be determined based on a price that is paid for a block of spots. For example, if a spot is 30 seconds long, then the per-spot price will correspond to a price that the advertiser 102 pays for a 30-second spot. Therefore, if the advertiser 102 has submitted a bid for a 30 second spot (e.g., advertisers B, C, and E in Table 1), then the price that the advertiser 102 pays for the spot is the per-spot price.

However, if the advertiser 102 has submitted a bid for a 60-second block of two spots, then the advertiser can be treated as requesting allocation of two 30-second spots. Therefore, the per-spot price can be determined, for example, by determining the price that the advertiser 102 will pay for each spot allocated to the advertiser 102. For example, advertisers A and D submitted bids of $1500 and $500, respectively, for 60-second blocks of spots. Therefore, if advertisers A and D paid a price equal to their bids for a 60 second spot then advertisers A and D would pay a per-spot price of $750 and $250 per-spot, respectively, because the block price is divided by the number of spots in the block.

FIGS. 2A-2D are block diagrams of example spot allocations to bidders. The bidders can be, for example, advertisers A-E provided in Table 1 above. The bidder information in Table 1 can be provided, for example, from the advertisement data store 114. The allocation subsystem 130 can receive data from a publisher identifying spots 206 and 208 that define block 211, and spots 210, 212, and 214 that define block 213, as the spots that are available for allocation. If advertiser A submits its 60 second bid for spots 206 and 208, and advertiser B submits a 30 second bid for spot 206, then allocation of spot 206 and can be based on the results of an auction for spot 206.

The auction can begin, for example, at a reserve price for spot 206. If the reserve price for the spot is $700, advertiser B can submit an initial bid of $700. Advertiser A can respond by bidding, for example, $1402 for spots 206 and 208. The allocation subsystem 130 can treat this bid of $1402 for both spots 206 and 208 as two per-spot bids of $701 for each of the spots 206, 208 individually. Therefore, advertiser A can increase its bid for spot 206 to $702 in an attempt to outbid advertiser B. Bidders A and B can continue iteratively increasing their respective bids.

Once the per-spot bid price reaches $750, advertiser A will have reached its maximum bid price of $1500 for spots 206 and 208. However, because advertiser B submitted a $1000 bid for spot 206, advertiser B can continue to increase its bid for spot 206. Therefore, spot 206 can be allocated to advertiser B, for example, at a per-spot bid price of $751. Advertiser B cannot be allocated spot 208 because advertiser B's bid is for a 60 second spot or block of spots, and spot 206 was allocated to advertiser A. Therefore, advertiser B will not be allocated any spots in the example auction. Similarly, if no other advertisers have submitted bids for spot 208, it may remain unallocated by the auction.

Spots may remain unallocated for a number of reasons. For example, there may be a lack of bidders that submitted bids for the spot, as mentioned above. Similarly, the bidders that submitted bids for the spot may have already been allocated other spots. Bidders may have exhausted their budget and therefore do not compete for a spot. Additionally, as spots are allocated to advertisers, publisher or advertiser constraints can prevent allocation of spots to advertisers who would have otherwise competed for the spot. For example, if a first advertiser is allocated to spot 206, then a restriction can prevent an advertiser in the same industry from occupying spot 208. Other constraints can similarly restrict allocation of spots to advertisers. Thus, it is possible that even if there is initially demand for a spot, the spot may remain unallocated.

The allocation subsystem 130 can auction spots 210, 212, and 214 at the same time that spots 206 and 208 are being auctioned. The auction for spots 210, 212, and 214 can be performed in a manner similar to the auction for spots 206 and 208. For example, advertisers C and D can bid on spot 210, while advertisers D and E can bid on spots 212 and 214. Because advertiser D has submitted a bid for a 60-second block, advertiser D may not be allocated any spots, unless advertiser D wins spots 212 and 214.

The allocation subsystem 130 can provide a starting price for the auction of spots 210, 212, and 214 at a reserve price that was specified by the publisher. Note that Advertiser C is the only bidder for spot 210. Therefore, advertiser C can be allocated spot 210 and pay the reserve price for spot 210.

Meanwhile, advertisers D and E can each compete for spots 212 and 214. Advertisers D and E can each continue to increase its respective bid and the auction can end when a per-spot bid of $251 is reached for spot 212 or 214 because advertiser D has submitted a block bid of $500 for a block including spots 212 and 214. Therefore, advertiser D's block bid corresponds to a per-spot bid of $250 such that advertiser D cannot bid more than $250 for either of the spots 212 or 214. Advertiser E can continue to increase its bids for spot 212 and 214 individually until the per-spot price for either spot 212 or spot 214 exceeds advertiser D's per spot bid (e.g., $251).

Figure 2A:
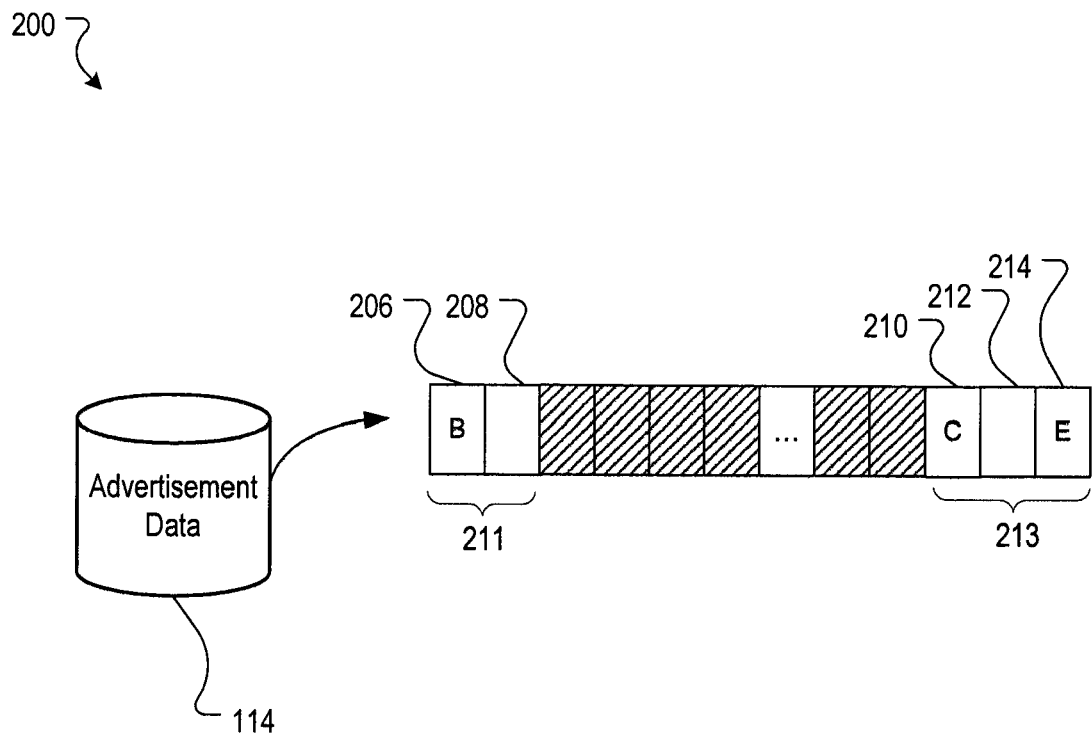
FIGS. 2A-2D are block diagrams of example spot allocations to bidders.

As illustrated in FIG. 2A, after allocation of the spots based on per-spot prices is complete, there may still be unallocated spots in the blocks 211 and 213. For example, the example allocation has ended with spots 208 and 212 remaining unallocated. In some implementations, allocation optimization can be performed to optimize the allocation of advertisers to the spots. For example, allocation optimization may be realized by allocating the spots based on a per-bid price, allocating unallocated spots to filler bidders, or de-allocating spots that are in a block that has not been completely allocated and allowing the advertisers that had been allocated to the block to bid on spots in other blocks. Each of these potential allocation optimizations are discussed below. While example allocation optimizations are provided, other allocation optimizations can be used.

§2.2.2 Per-Bid Price Optimization

In some implementations, allocation optimization can be performed following an initial allocation that is based on a per-spot price. The optimization can be performed, for example, on a per-block basis. For example, publishers can require that all spots in a block be allocated, and a failure to do so can result in a release of all spots in the block. Therefore, the optimization can be directed to completely allocating advertisement spots on a per-block basis. Thus, the optimization can be performed on blocks that include unallocated spots after the allocation based on a per-spot price.

In some implementations, the allocation subsystem 130 can identify blocks for optimization by identifying blocks that include unallocated spots following the per-spot price based allocation. For example, if the per-spot price allocation resulted the allocation presented in FIG. 2A, the allocation subsystem 130 can identify blocks 111 and 113 as blocks for which allocation can be optimized.

Once the allocation subsystem 130 identifies a block for optimization, the allocation subsystem 130 can de-allocate the spots that were allocated in the block during the per-spot price allocation. In turn, another auction can be performed based on per-bid prices. A per-bid price can correspond to the total price that an advertiser is willing to pay for the spots that the advertiser is requesting. For example, advertiser A is willing to pay a maximum per-bid price of $1500 based on its bid. Similarly, advertiser B is willing to pay a maximum per-bid price of $1000 based on its bid. In some implementations, all advertisers that submitted bids for the spots can be included in the per-bid price optimization, even if the advertisers were not allocated spots based on the per-spot price allocation.

The allocation subsystem 130 can again begin the auction by providing the reserve price for each spot. Similarly, each advertiser can iteratively increase its bid until the advertiser has reached its maximum bid. However, because the auction is based on a per-bid price, rather than a per-spot price, advertiser A and advertiser B can compete for spot 206 based on the total price that each is willing to pay for all of the spots that either advertiser is requesting, rather than the price that each advertiser is willing to pay for spot 206 in isolation. Thus, the per-bid price allocation can require advertisers to pay for the maximum number of spots requested by the advertisers that are competing for allocation of a common spot (e.g., advertiser B can be required to pay for two spots because advertiser A has requested two spots and is competing with advertiser B for a common spot).

Continuing with the example above, advertiser A is requesting two spots (206 and 208) while advertiser B is requesting one spot (206). Because advertiser A and advertiser B are both requesting spot 206 (e.g., a common spot), advertiser B can be required to pay for both spots 206 and 208 if advertiser B wins the allocation of spot 206. Therefore, each advertiser can iteratively increase their bid for the spots 206 and 208 to their maximum bid. In this example, the auction can end when advertiser A bids a per-bid price of $1001 both spots 206 and 208 because advertiser B's maximum bid price is $1000. Therefore, the per-bid price allocation can result in reallocation of spots 206 and 208 to advertiser A for a price of $1001.

Figure 2B:
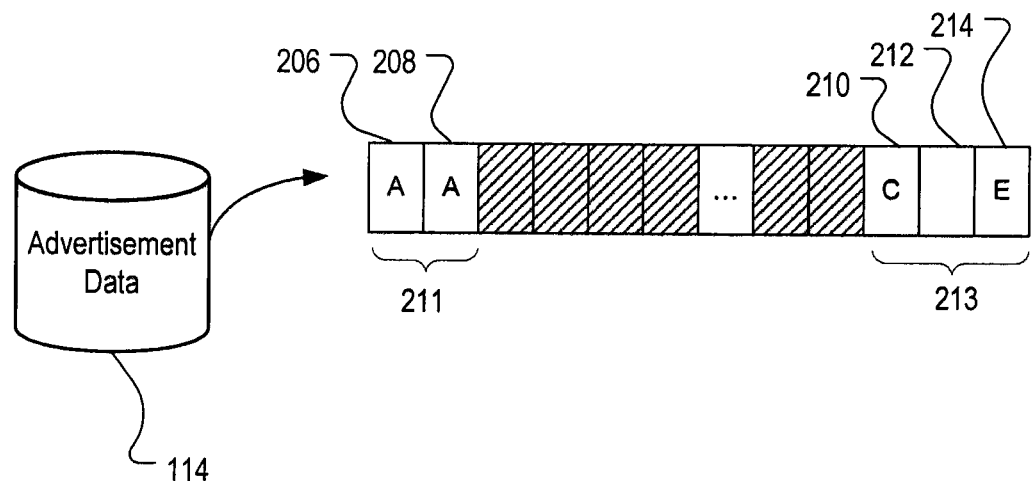

FIG. 2B illustrates the allocation that results from the per-bid price allocation. In some implementations, the allocation of block 211 can be finalized because the spots 206 and 208 of block 211 have been completely allocated. In other implementations, further optimization can be performed on the allocation of block 211.

The per-bid price allocation optimization can improve allocation efficiency by allocating the spots based on the value of the spots to the advertisers that are competing for the spots. For example, while advertiser B's bid placed a higher value on spot 206 than advertiser A, advertiser A's bid placed a higher value on the combination of spots 206 and 208 than advertiser B's bid. Thus, more spots were allocated to advertisers at a lower price-per-spot, while increasing the total revenue received for the spots 206, 208. Similarly, both spots 206 and 208 were allocated, rather than leaving spot 208 unallocated, thereby satisfying the publisher's requirement that a block be completely allocated. Thus, a more efficient allocation may be achieved for spots by allocating the spots based on a per-bid price.

The allocation optimization based on a per-bid price can similarly be performed for the spots 210, 212, and 214 of block 213. For example, the spots 210, 212, and 214 can be allocated among advertisers C, D, and E as shown in FIG. 2B. Advertiser C can again be allocated to spot 210 for the reserve price, as no other bidders are available to compete for spot 210. Advertiser E is also reallocated to spot 214, but will be required to pay a per-bid price of $501 for the allocation. Because advertiser D is competing for spots 212 and 214 together, advertiser E is required to pay for spots 212 and 214 as described above with reference to spots 206 and 208. Thus, while the actual allocation among advertisers remains the same for block 213, the price paid by advertiser more accurately reflects the value of the spots 212 and 214.

In some implementations, the allocation subsystem 130 can perform an additional auction on any unallocated spots. For example, allocation subsystem 130 can attempt to auction spot 212 to any other bidders that have submitted bids for spot 214. The allocation subsystem 130 can again begin the auction at the reserve price of spot 214. Any bidders can again compete for the spot 214 and if a winning bidder is identified with a bid that satisfies the reserve price, spot 214 can be allocated to that bidder. In some implementations, if spot 214 still remains unallocated, further allocation optimization can be performed using filler bidders.

§2.2.3 Filler Bidder Allocation

In some implementations, the allocation subsystem 130 can further optimize the allocation by using filler bidders to allocate spots that remain unallocated. Filler bidders can be, for example, public service announcement advertisers. These filler bidders can be allocated spots, for example, without payment. While filler bidders may not increase revenue received for the spots, they can be used to maintain the value of spots that have been allocated, and to satisfy block-filling constraints.

When the allocation subsystem 130 identifies a block containing an unallocated spot, the allocation subsystem 130 can determine if the spot can be allocated to a filler bidder. Continuing with the example above, spot 212 remains unallocated after the per-bid price optimization. Therefore, if the publisher requires block 213 to be fully allocated, then spot 212 must be allocated for any of the spots in block 213 to be allocated. If spot 212 cannot be allocated to a filler bidder, the allocation that resulted from the per-bid price allocation may not be finalized.

Further, the publisher may require that any blocks include unallocated spots be released, for example, to the publisher. Therefore, spots 210 and 214 may be de-allocated from advertisers C and E, respectively, if spot 212 is not allocated. Thus, allocation of a filler bidder to spot 212 can complete the allocation of block 213, thereby preventing release of the block 213 to the publisher. In turn, advertisers C and E can maintain their respective allocations. Thus, the value of spots 210 and 214 can be maintained.

In some implementations, the allocation subsystem 130 can identify filler bidders for spot allocation based on the filler bidder's bid criteria. For example, filler bidders can be associated with a filler bidder flag, a null bid, or some other criterion that identifies the bidder as a filler bidder. Thus, the allocation subsystem 130 can identify potential filler bidders for allocation of the unallocated spot.

The filler bidders can be further selected for spot allocation by the allocation subsystem 130 based upon other bid criteria or constraints. While the filler bidders may not submit a bid price or submit a bid price of $0, the filler bidders can still submit spot criteria and other bid constraints. For example, a filler bidder may require a 60-second spot. Similarly, the filler bidder may require that the spot be associated a spot at a specific time, or targeted to a particular demographic. Thus, if none of the unallocated spots satisfies the filler bidder's bid criteria, then the filler bidder may not be considered for allocation of the unallocated spot.

For example, the allocation subsystem 130 can search for a filler bidder that can be allocated spot 212. If a bidder is identified having bid criteria that corresponds to spot 212, then spot 212 can be allocated to the filler bidder. Because the filler bidder completes allocation of the block 213, the allocation subsystem 213 can finalize the allocation of the spots 210, 212, and 214 in block 213. However, if the allocation subsystem 130 is unable to identify a filler bidder for spot 213. Then the allocation may not be finalized, and additional optimization can be performed on the allocation to attempt to fill the block 213.

§2.2.4 Re-Allocation Based Optimization

Figure 2C:
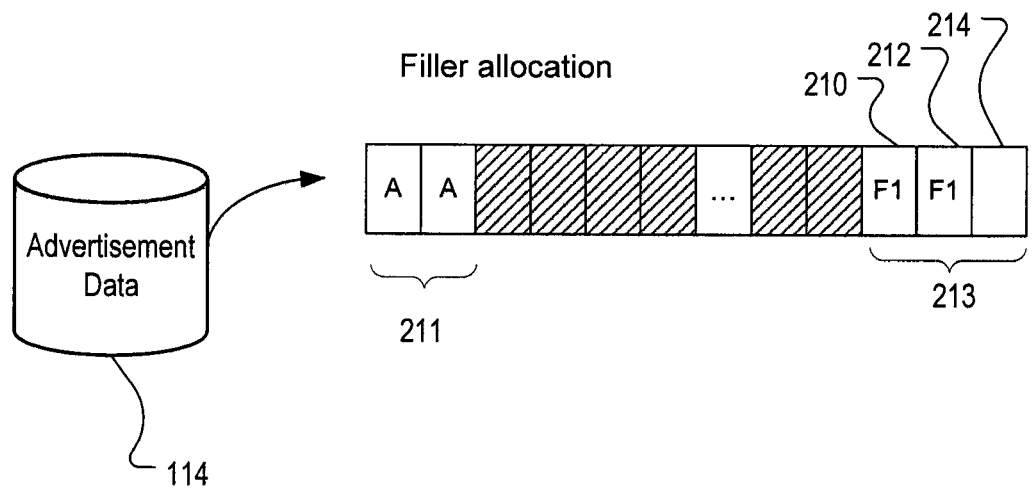

An example, additional optimization can be the re-allocation of spots. In some implementations, the allocation subsystem 130 can de-allocate the spots in a block that includes unallocated spots following allocation of spots to filler bidders. For example, if a filler bidder is not identified for spot 212, the allocation subsystem can de-allocate spots 210 and 214. In turn, the allocation subsystem 130 can first allocate the spots 210, 212, and 214 to filler bidder F1 as shown in FIG. 2C. Allocating the spots 210 and 212 of block 213 to filler bidder F1 prior to allocation of spots to bidders C, D, or E allows filler bidder F1 to occupy spots 210 and 212 without considering the previous allocation of spot 210. As shown in FIG. 2C, it is still possible that filler bidders might not be identified for each available spot. Therefore, block 213 can still include unallocated spots (e.g., spot 214).

Once block 213 has been allocated to filler bidders, the allocation subsystem 130 can re-allocate the spots 210, 212, and 214 to paying bidders (e.g., advertisers) according to an auction for the spots. In some implementations, the re-allocation can include a re-allocation constraint that requires any re-allocation to fully reallocate the spots that were previously allocated.

For example, spots 210 and 212 are allocated to a single filler bidder F1. Therefore, the re-allocation constraint can require that any re-allocation of either spot 210 or 212 also results in re-allocation of the other spot 212 or 210, respectively. Thus, an advertiser that requests either spot 210 or 212, but not both, cannot be allocated either of the spots 210 or 212 because allocation of either spot 210 or 212 individually would result in a less than complete re-allocation. Similarly, the re-allocation constraint can require allocation of spot 214 individually or to an advertiser that has requested the entire block 213.

Figure 2D:
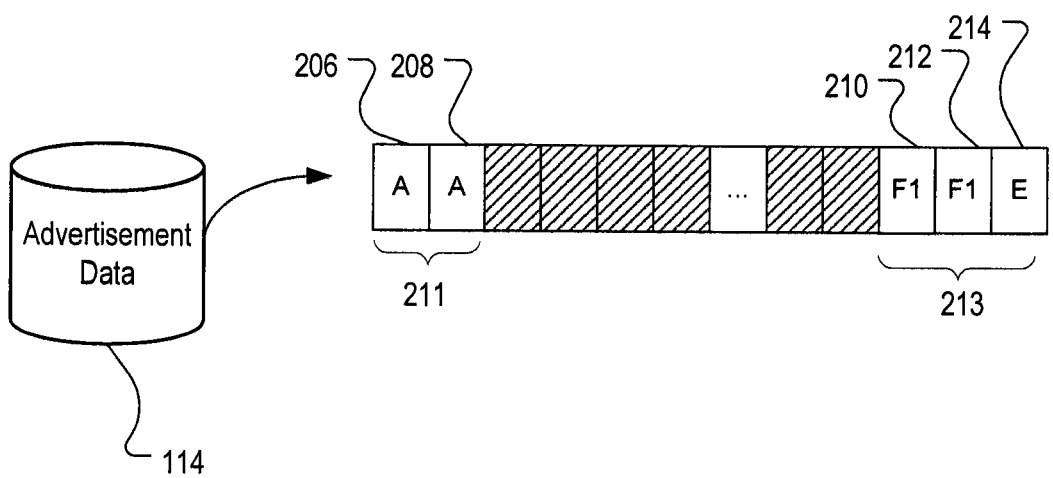

The result of an example re-allocation is provided in FIG. 2D. In this example, spots 210 and 212 can remain allocated to filler bidder F1 because no bids have been received for spots 210 and 212 together. While advertiser C has submitted a bid for spot 210 and advertise D has submitted a bid for spots 212 and 214, each of these allocations would result in breaking the allocation of spots 210 and 212 to filler bidder F1. Thus, the allocation of block 213 can be finalized according to the allocation in FIG. 2D. In some implementations, the allocation subsystem 130 can finalize all allocations when the blocks 211 and 213 have been filled. In other implementations, the allocation subsystem 130 can perform additional optimization of the allocations.

In some implementations, a complete allocation of all blocks may not result from the allocation optimization. In these implementations, a block containing an unallocated spot can be released, for example, to the publisher or another allocation subsystem. In some implementations, when a block is released, the advertisers that were allocated spots in the released block can compete for spots in other blocks, even if the blocks are fully allocated. Allowing the advertisers to compete for spots in other blocks can facilitate efficient allocation of the spots because the advertisers may have competed, or continued to compete, for the spots in the other blocks if the block that was released had not been considered in the allocation.

§3.0 Example Allocation Subsystem

Figure 3:
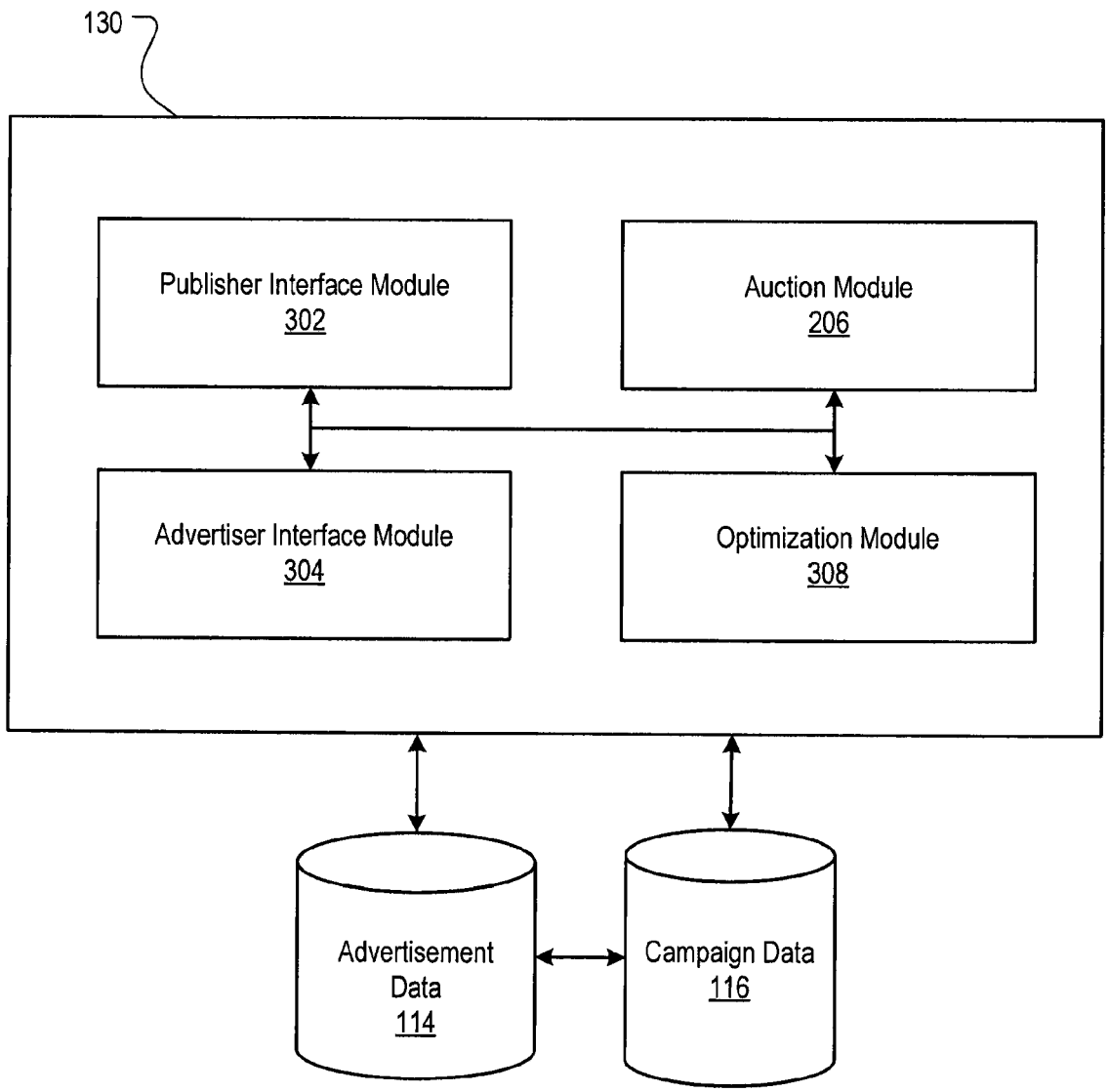
FIG. 3 is a block diagram of an example allocation subsystem.

In some implementations, spot allocation can be performed, for example, by the allocation subsystem 130. FIG. 3 is a block diagram of an example allocation subsystem 130. In some implementations, the allocation subsystem 130 can include a publisher interface module 302, an advertiser interface module 304, an auction module 306, and an optimization module 308. The allocation subsystem 130 can be implemented, for example, in a data processing system (e.g., a computer, server, or other data processing system).

The publisher interface module 302 can be operable to receive data from publishers that identifies spots that are available for allocation by the allocation subsystem. The publisher interface module 302 can identify the advertisement spots that the publisher is submitting for allocation based on the data received. In some implementations, the publisher interface module 302 can define two or more contiguous spots as an advertisement block. The publisher interface 302 can store the identified spots in the advertisement inventory store 114 of FIG. 1.

In some implementations, the publisher interface module 302 can provide a user interface that a publisher can use to interact with the publisher interface module 302. For example, the user interface can be implemented as a web page that can be accessed by a computing device at the publisher's location.

The advertiser interface module 304 can be operable to receive data from advertisers that are requesting allocation of spots. The advertiser interface module 304 can store the data received from the advertisers in the advertisement data store 116. In some implementations, the advertiser interface module 304 can also receive advertisement content that corresponds to the data. For example, an advertiser may submit bid criteria to be considered in an auction for a spot. The advertiser can also upload the content of the advertisement will be presented in a spot that the advertiser is allocated. The advertisement content can be stored, for example, in the advertisement data store 116.

In some implementations, the advertiser interface module 304 can provide a user interface that an advertiser can use to interact with the advertiser interface module 304. For example, the user interface can be implemented as a web page that can be accessed by a computing device at the advertiser's location.

The auction module 306 can be operable to perform an allocation of spots to advertisers based on an auction. In some implementations, the auction can be a simultaneous ascending price auction that can allocate all available spots to advertisers in a single auction. For example, the auction module 306 can provide an auction for all spots occurring within a 24-hour period to all bidders. In turn, the auction module 306 can allocate spots to advertisers, for example, based on a per-spot price and other bid criteria. Additionally, the auction module 306 can restrict allocation of spots to advertisers based, for example, on spot restrictions that were submitted to the publisher interface module 302 and stored in the advertising inventory module 114. The auction module 306 is operable to allocate spots to advertisers and determine a price for the allocation through the auction. The auction module 306 can provide the results of the auction to the optimization module 308.

The optimization module 308 can receive the auction results and perform optimization tasks on the allocation that resulted from the auction. In some implementations, the optimization module 308 can instruct the auction module to re-allocate the spots to advertisers based on a per-bid price. The per-bid price can be the maximum price that an advertiser will pay for spot allocation, regardless of the number of spots requested. Once spots are allocated based on a per-bid price, the optimization module 308 can instruct the auction module 306 to re-auction any unallocated spots starting at each spot's reserve price.

In some implementations, when one or more spots of a block remain unallocated after the per-bid-price allocation, the optimization module 308 can instruct the auction module 306 to allocate the unallocated spots to filler bidders. The filler bidders can be, for example, public service announcement advertisers. These filler bidders can be identified according to a bid criterion (e.g., filler bidder flag) that is associated with the filler bidder. The filler bidders can also be associated with additional bid criteria, for example, that defines the characteristics of the spots that the filler bidder is requesting.

The optimization module 308 can be further operable to de-allocate spots that are in a block that is not completely allocated following the allocation of spots to filler bidders. In turn, the optimization module 308 can instruct the auction module 306 to allocate the de-allocated spots to filler bidders prior to allocating the spots to paying advertisers. After allocation of the spots to filler bidders, the optimization module 308 can instruct the auction module 306 to re-allocate the spots according to another auction with a re-allocation constraint.

When a block contains unallocated spots following allocation based on the re-allocation constraint, the optimization module 308 can release the block from allocation and allow the advertisers that were allocated spots in the released block to compete in an auction for other spots.

The optimization module 308 can be implemented to include additional or fewer optimization tasks depending on a performance measure to be optimized. For example, monetary, demographic, impression or any other measure of advertising effectiveness can be optimized.

§4.0 Example Allocation Process

Figure 4:
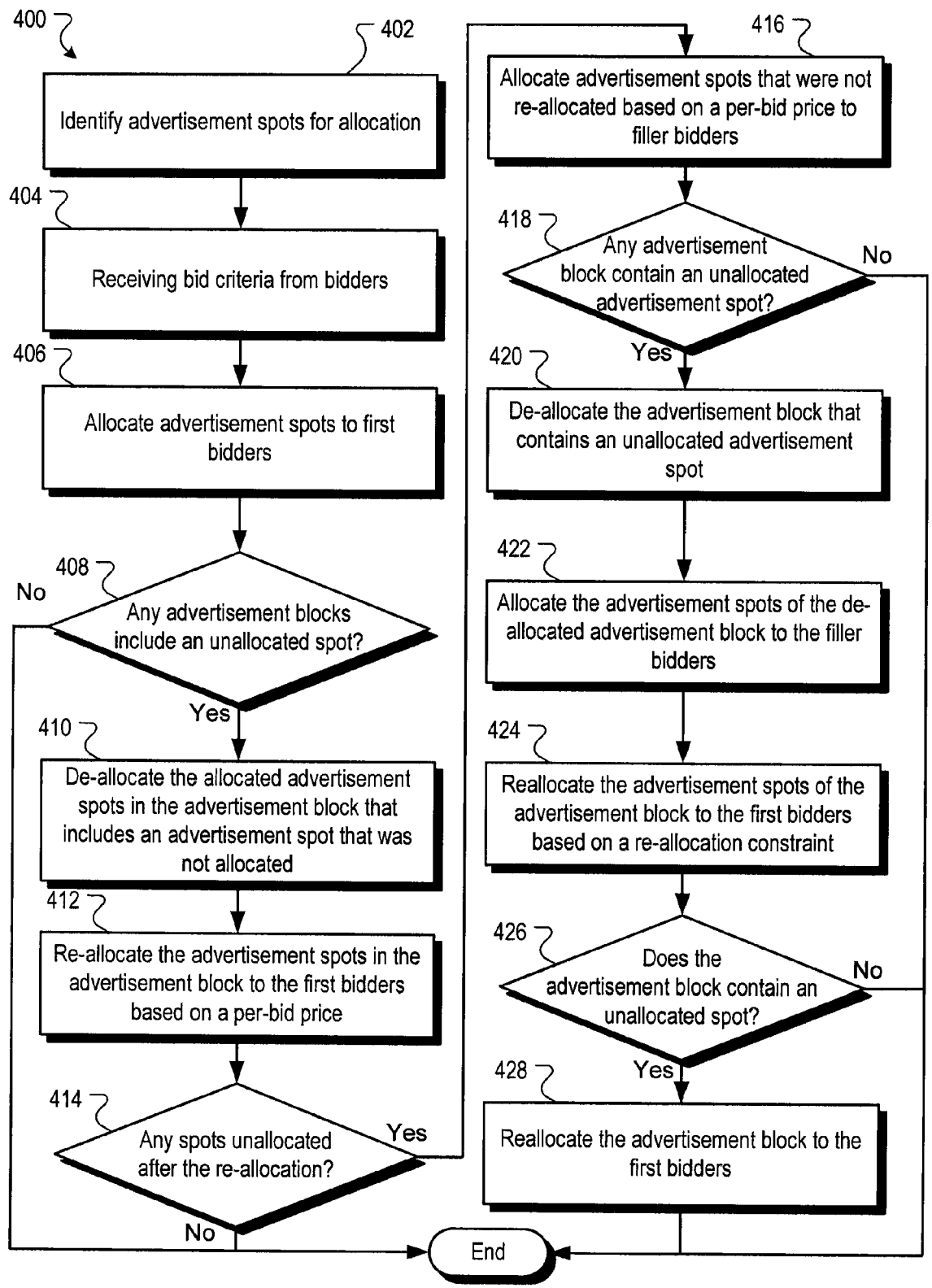
FIG. 4 is a flow chart of an example process of allocating advertisement spots.

FIG. 4 is a flow chart of an example process 400 of allocating advertisement spots. The process can be implemented, for example, in the allocation subsystem 130 of FIG. 3. In some implementations, the spots can be portions of a television or radio commercial break. In other implementations, the spots can be portions of advertisement space for print media or web pages that are auctioned in advance of publication.

Advertisement spots for allocation are identified (402). In some implementations, two or more contiguous advertisement spots define an advertisement block. The advertisement spots can be identified for allocation, for example, based on data provided by publishers. The data include the time, duration, television channel, radio frequency, demographics, or any other data that can be used to define the spot to be allocated. The advertisement spots can be identified, for example, by the publisher interface module 302.

Bid criteria from bidders are received (404). The bid criteria can include, for example, a bid price, budget, spot criteria, or any other criteria that can be used to define the bid. The bid criteria can be received, for example, by the advertiser interface module 304.

Advertisement spots are allocated to first bidders based on a per-spot price (406). The per-spot price can correspond, for example, to the price that an advertiser is willing to pay for each contiguous spot that is allocated to the advertiser. The advertisement spots can be allocated, for example, according to a simultaneous ascending price auction. The allocation can be performed, for example, by the auction module 306.

A determination is made whether any advertisement blocks include an unallocated spot (408). If no advertisement blocks include an unallocated spot, the process 400 ends. If, however an advertisement block includes an unallocated spot, then the allocated advertisement spots in the advertisement block that includes an advertisement spot that was not allocated are de-allocated (410). The de-allocation can be performed, for example, by the optimization module 308 and/or the auction module 306.

The advertisement spots in the advertisement block are re-allocated to the first bidders based on a per-bid price (412). The allocation can, for example, require a winning bidder to pay for the maximum number of contiguous spots that were requested with any advertiser's request for the spot. In some implementations, the allocation can be performed, for example, by the auction module 306 and/or the optimization module 308.

A determination is made whether there are spots unallocated after the re-allocation (414). The process 400 ends if there are no unallocated spots; otherwise, advertisement spots that were not re-allocated based on a per-bid price to filler bidders are allocated (416). In some implementations, the filler bidders can be bidders that are allocated advertisement spots without payment (e.g., public service announcements). The filler bidders can be identified, for example, based on a bid criterion (e.g., filler bidder flag). The allocation to the filler bidders can be based, for example, on bid criteria that are associated with the filler bidder. The advertisement spots can be allocated, for example, by the auction module 306 and/or the optimization module 308.

A determination is made whether any advertisement block contains an unallocated advertisement spot (418). The process 400 ends if no advertisement blocks contain an unallocated advertisement spot; otherwise, the advertisement block that contains an unallocated advertisement spot is de-allocated (420). In some implementations, the advertisement block can be de-allocated by de-allocating all of the spots in the advertisement block. The advertisement block can be de-allocated, for example, by the auction module 306 and/or the optimization module 308.

The advertisement spots of the de-allocated advertisement block are allocated to the filler bidders (422). In some implementations, the filler bidders can be allocated to the spots in the de-allocated advertisement block without considering the previous allocation of first bidders to the advertisement spots. The allocation can be performed, for example, by the auction module 306 and/or the optimization module 308.

The advertisement spots of the advertisement block are re-allocated to the first bidders based on a re-allocation constraint (424). In some implementations, the re-allocation constraint can require spots that are allocated to a first common bidder be re-allocated together to a second common bidder. The re-allocation can be performed, for example, by the auction module 306 and/or the optimization module 308.

A determination is made whether the advertisement block contains an unallocated spot (426). In some implementations, the process 400 ends if the advertisement block does not contain an unallocated spot; otherwise, the advertisement block is released. The advertisement block can be released, for example, by the auction module 306 and/or the optimization module 308. In some implementations, the entire process 400 can be performed again on the released advertisement blocks before terminating.

§5.0 Example Computer System

Figure 5:
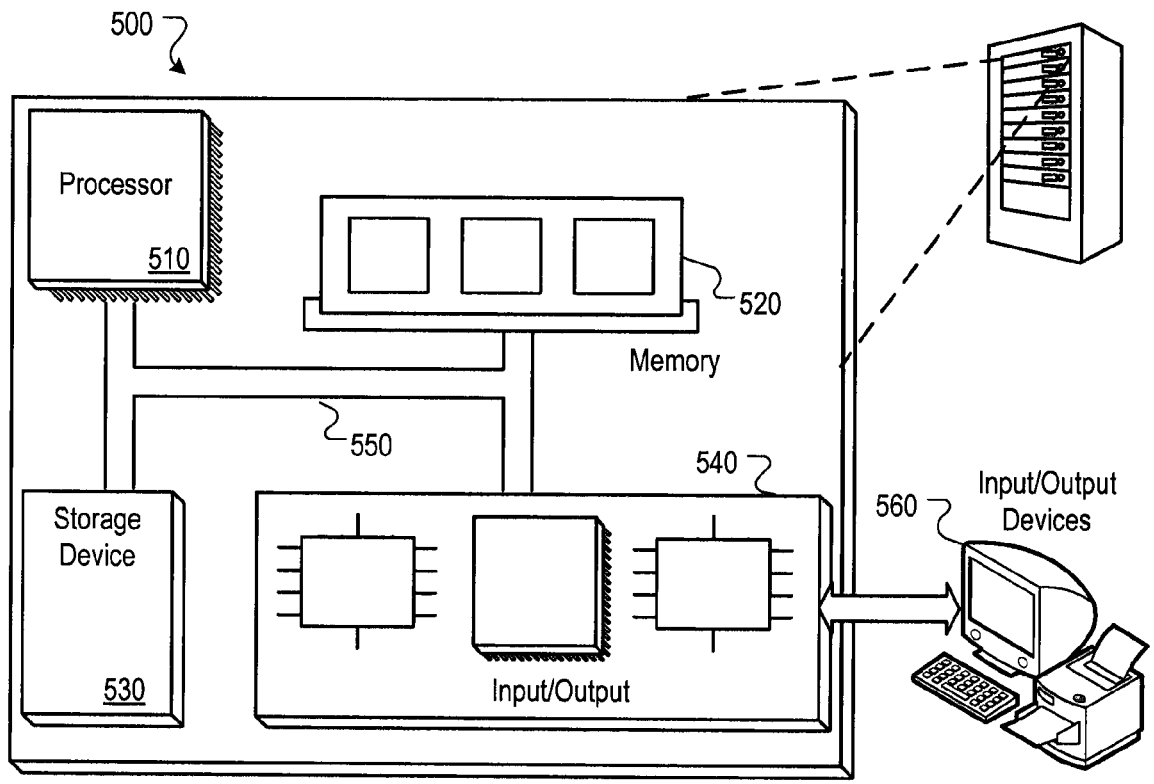
FIG. 5 is block diagram of an example computer system that can be used to facilitate allocation of advertisement spots.

FIG. 5 is block diagram of an example computer system 500 that can be used to facilitate allocation of advertisement spots. The system 500 includes a processor 510, a memory 520, a storage device 530, and an input/output device 540. Each of the components 510, 520, 530, and 540 can be interconnected, for example, using a system bus 560. The processor 510 is capable of processing instructions for execution within the system 500. In one implementation, the processor 510 is a single-threaded processor. In another implementation, the processor 510 is a multi-threaded processor. The processor 610 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

The allocation subsystem 130 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The allocation subsystem 130 can be distributively implemented over a network, such as a server farm, or can be implemented in a single computer device.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" and "subsystem" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. While reference is made to delivering advertisements, other forms of content including other forms of sponsored content can be delivered.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
identifying, by a data processing device and for allocation, advertisement spots in an advertisement block, wherein the advertisement block includes two or more contiguous advertisement spots, each advertisement spot being a time-slot during which an advertisement is presented, the advertisement block having a full block restriction that requires every advertisement spot in the advertisement block to be allocated in order for any advertisement spot in the advertisement block to remain allocated;
receiving, by a data processing device, bid criteria from bidders;
allocating, by a data processing device, individual advertisement spots from the advertisement block to first bidders based on per-spot prices for the first bidders, the per-spot price for each of the first bidders being based on the bid criteria and specifying a maximum price that the first bidder will pay for being allocated only one individual advertisement spot in the advertisement block;
determining that the full block restriction is violated based on at least one of the advertisement spots in the advertisement block having not been allocated based on the per-spot price allocation;
in response to determining that the full block restriction has been violated, de-allocating, by a data processing device, the allocated advertisement spots in the advertisement block; and
re-allocating, by a data processing device, a set of two or more contiguous advertisement spots in the advertisement block to a same first bidder based on per-bid prices for the first bidders, the per-bid price for each of the first bidders being based on the bid criteria and specifying a maximum price that the first bidder will pay for being allocated the set of two or more contiguous advertisement spots in the advertisement block.

2. The method of claim 1, further comprising:
allocating advertisement spots, from the advertisement block, that were not re-allocated based on the per-bid price to filler bidders;
determining that at least one advertisement spot remains unallocated following allocation of the advertisement spots to the filler bidders; and
de-allocating the advertisement spots in the advertisement block to create a de-allocated advertisement block the de-allocating being performed in response to determining that the advertisement block includes the at least one unallocated advertisement spot after allocation of the advertisement spots to the filler bidders.

3. The method of claim 2, further comprising:
allocating the advertisement spots of the de-allocated advertisement block to the filler bidders;
re-allocating the advertisement spots of the de-allocated advertisement block to the first bidders based on a re-allocation constraint that requires a set of two or more contiguous spots that were previously allocated to a same first bidder be re-allocated together to a same second bidder; and
releasing the advertisement block for allocation by a publisher when the advertisement block is not completely allocated after the re-allocation of the set of two or more contiguous advertisement spots based on the re-allocation constraint.

4. The method of claim 3, wherein re-allocating the advertisement spots of the advertisement block to the first bidders based on a re-allocation constraint comprises:
allocating, to a first bidder, an unallocated advertisement spot or unallocated advertisement block while maintaining the allocation of the advertisement spots of the de-allocated advertisement block to the filler bidders; and
re-allocating an allocated advertisement spot or an allocated advertisement block to a first bidder when the allocation results in complete re-allocation of the allocated advertisement spot or complete re-allocation of the allocated advertisement block.

5. The method of claim 3, wherein the filler bidders are public service announcement advertisers.

6. The method of claim 1, wherein the per-bid price corresponds to a total price that a bidder will pay for every spot allocated to the bidder.

7. The method of claim 1, wherein the bid criteria includes one or more bid constraints that limit the allocation of spots to the bidder.

8. The method of claim 1, wherein the advertisement spots are television advertisement spots.

9. The method of claim 1, wherein the advertisement spots are radio advertisement spots.

10. A computer implemented method, comprising:
identifying, by a data processing device, blocks of spots for auction, each block being a collection of two or more contiguous spots;
receiving, by a data processing device, bids for the spots from first bidders;
allocating, by a data processing device, individual spots to the first bidders based on a per-spot price for each spot, the per-spot price being based on the bids for the spots;
identifying, by a data processing device and after the allocating, an available block that includes an unallocated spot, the available block being identified from the blocks of spots;
determining that the available block has a full block restriction that requires every spot in the available block to be allocated in order for any advertisement spot in the available block to remain allocated;
in response to determining that the available block has a full block restriction, de-allocating, by a data processing device, all spots in the available block that were allocated based on the per-spot; and
re-allocating, by a data processing device, two or more contiguous spots in the available block to a same first bidder, the re-allocation being performed based on per-bid prices for the first bidders, the per-bid price for each of the first bidders being based on the bids and specifying a maximum price that the first bidder will pay for being allocated the two or more contiguous spots.

11. The method of claim 10, further comprising allocating unallocated spots in the available block to filler bidders.

12. The method of claim 11, further comprising:
determining that the available block has an unallocated spot after allocating spots in the available block to the filler bidders; and
in response to determining that the available block has an unallocated spot:
de-allocating all spots in the available block;
allocating the spots in the available block to the filler bidders; and
after allocating the spots to the filler bidders, re-allocating at least a portion of the spots in the available block to the first bidders on per-bid prices, the allocations being subject to allocating unallocated spots and not creating unallocated spots by allocating spots that are allocated to filler bidders and first bidders when the re-allocation includes all of the spots allocated to the filler bidders and first bidders.

13. The method of claim 12, wherein the filler bidders are public service announcement advertisers.

14. The method of claim 10, wherein the advertisement spots are television advertisement spots.

15. The method of claim 10, wherein the advertisement spots are radio advertisement spots.

16. A computer readable storage device comprising instructions executable by a processing device and upon such execution cause the processing device to perform operations comprising:
- identifying blocks of spots for auction, each block being a collection of two or more contiguous spots;
- receiving bids for the spots from first bidders;
- allocating individual spots to the first bidders based on a per-spot price for each spot, the per-spot price being based on the bids for the spots;
- identifying, after the allocating and from the identified blocks, an available block that includes an unallocated spot;
- determining that the available block has a full block restriction that requires every spot in the available block to be allocated in order for any advertisement spot in the available block to remain allocated;
- in response to determining that the available block has a full block restriction, de-allocating all spots in the available block that were allocated based on the per-spot; and
- re-allocating two or more contiguous spots in the available block to a same first bidder, the re-allocation being performed based on per-bid prices for the first bidders, the per-bid price for each of the first bidders being based on the bids and specifying a maximum price that the first bidder will pay for being allocated the two or more contiguous spots.

17. The computer readable storage device of claim 16, wherein the instructions further cause the processing device to perform operations comprising allocating unallocated spots in the available block to filler bidders.

18. The computer readable storage device of claim 17, wherein the instructions further cause the processing device to perform operations comprising:
- determining that the available block has an unallocated spot after allocating spots in the available block to the filler bidders; and
- in response to determining that the available block has an unallocated spot:
  - de-allocating all spots in the available block;
  - allocating the spots in the available block to the filler bidders; and
  - after allocating the spots to the filler bidders, re-allocating at least a portion of the spots in the available block to the first bidders on per-bid prices, the allocations being subject to allocating unallocated spots and not creating unallocated spots by allocating spots that are allocated to filler bidders and first bidders when the re-allocation includes all of the spots allocated to the filler bidders and first bidders.

19. A system, comprising:
- a publisher interface module, including at least one processor, operable to receive data from publishers and identify an advertisement block including two or more contiguous advertisement spots for allocation;
- an advertiser interface module, including at least one processor, operable to receive bid criteria from bidders; and
- an auction module, including at least one processor, operable to perform operations including:
  - allocating individual advertisement spots in the advertisement block to first bidders based on per-spot prices for the first bidders, the per-spot price for each of the first bidders being based on the bid criteria and specifying a maximum price that the first bidder will pay for being allocated only one individual advertisement spot in the advertisement block; and
  - determining that the advertisement block has a full block restriction that requires every spot in the advertisement block to be allocated in order for any advertisement spot in the advertisement block to remain allocated;
  - determining that the full block restriction for the advertisement block is violated based on at least one of the advertisement spots in the advertisement block having not been allocated by the per-spot price allocation;
  - in response to determining that the full block restriction has been violated, de-allocating the allocated advertisement spots in the advertisement block; and
  - re-allocating a set of two or more contiguous advertisement spots in the advertisement block to a same first bidder based on per-bid prices for the first bidders, the per-bid price for each of the first bidders being based on the bid criteria and specifying a maximum price that the first bidder will pay for being allocated the set of two or more contiguous advertisement spots in the advertisement block.

20. The system of claim 19, wherein the auction module is further operable to perform operations comprising:
- allocating, to filler bidders and form the advertisement block, advertisement spots that were not re-allocated based on a per-bid price to the first bidders; and
- de-allocating the advertisement block based on the advertisement block including an unallocated advertisement spot after allocation of the advertisement spots to the filler bidders.

21. The system of claim 20, wherein the auction module is further operable to perform operations comprising:
- allocating the advertisement spots of the de-allocated advertisement block to the filler bidders;
- re-allocating the advertisement spots of the de-allocated advertisement block to the first bidders based on a re-allocation constraint that requires a set of two or more contiguous spots that are allocated to a same first bidder be re-allocated together to a same second bidder; and
- releasing the advertisement block for allocation by a publisher when the advertisement block is not completely allocated after the re-allocation of the set of two or more contiguous advertisement spots based on the re-allocation constraint.

* * * * *

UNITED STATES PATENT AND TRADEMARK OFFICE
CERTIFICATE OF CORRECTION

| | | |
|---|---|---|
| PATENT NO. | : 8,615,436 B2 | Page 1 of 1 |
| APPLICATION NO. | : 12/504152 | |
| DATED | : December 24, 2013 | |
| INVENTOR(S) | : Stephen G Stukenborg et al. | |

It is certified that error appears in the above-identified patent and that said Letters Patent is hereby corrected as shown below:

On the title page, item (75), Column 1 (Inventors), line 5, delete "Kaustuv Kaustuv," and insert -- Kaustuv, --, therefor.

Signed and Sealed this
Fifteenth Day of April, 2014

Michelle K. Lee
*Deputy Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 8,615,436 B2 | |
| APPLICATION NO. | : 12/504152 | |
| DATED | : December 24, 2013 | |
| INVENTOR(S) | : Steve Stukenborg et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this
Seventh Day of July, 2015

Michelle K. Lee
*Director of the United States Patent and Trademark Office*